United States Patent [19]

Pemberton

[11] 4,284,103
[45] Aug. 18, 1981

[54] RANDOM ACCESS VALVE

[76] Inventor: J. C. Pemberton, 10222 San Diego Mission Rd., San Diego, Calif. 92120

[21] Appl. No.: 147,010

[22] Filed: May 6, 1980

Related U.S. Application Data

[63] Continuation of Ser. No. 904,042, May 8, 1978, abandoned, which is a continuation of Ser. No. 671,522, Mar. 29, 1976, abandoned.

[51] Int. Cl.³ ............................................. F16K 11/06
[52] U.S. Cl. .................................. 137/625; 137/625.4; 137/625.48; 251/31
[58] Field of Search ............... 137/625, 625.11, 625.17, 137/625.2, 625.25, 625.4, 625.66, 625.48, 625.68, 637; 251/31, 62; 92/61, 62, 72, 75, 151; 235/201 ME

[56] References Cited

U.S. PATENT DOCUMENTS

| | | | |
|---|---|---|---|
| 2,828,767 | 4/1958 | Barusch | 137/625.48 X |
| 3,071,155 | 1/1963 | Danley | 137/625 |
| 3,103,233 | 9/1963 | Wolf | 137/625.25 |
| 3,246,667 | 4/1966 | Pemberton | 137/625.11 |
| 3,457,957 | 7/1969 | Mueller | 137/625.25X |
| 3,494,175 | 2/1970 | Cusuk et al. | 137/625.11 X |
| 3,530,893 | 9/1970 | Masuda | 137/625.25 |
| 3,736,959 | 6/1973 | Parkinson | 137/625.17 |
| 3,965,936 | 6/1976 | Lyon | 137/625.17 |

FOREIGN PATENT DOCUMENTS 1282386  11/1968  Fed. Rep. of Germany ...... 137/625.48

Primary Examiner—William R. Cline
Attorney, Agent, or Firm—Jessup & Beecher

[57] ABSTRACT

A control valve which can randomly select any one of a plurality of conduits for controlling the flow to a single output port. The valve is comprised of base plate and a cover or bearing plate, which together form a housing having a cavity. A slider or block of the same shape, but slightly smaller than the cavity, is confined in, but may move freely in the cavity to align a port in the base plate with ports in the slider. The slider has a plurality of ports and as the slider is moved from one corner of the cavity to another, the ports in the slider are selectively aligned with the port in the base plate. Fluid conduits may be connected directly to the ports in the slider through an aperture in the bearing plate. Actuators in the walls of the cavity selectively move the slider from corner to corner. The actuators may be driven by any suitable means.

18 Claims, 13 Drawing Figures

RANDOM ACCESS VALVE

This is a continuation of Ser. No. 904,042, filed May 8, 1978, in turn a continuation of Ser. No. 671,522, filed Mar. 29, 1976, now both abandoned.

BACKGROUND OF THE INVENTION

This invention relates generally to a valve which can selectively connect a plurality of conduits to a single port and more particularly relates to a control valve which can be programmed in any predetermined sequence.

Control valves for selectively controlling the flow in a plurality of conduits are available in the art. However, they suffer from various disadvantages, such as being unable to rapidly move from one conduit to another and assure proper alignment. That is, the valve generally cannot move from one conduit to another rapidly and assure proper alignment of a conduit with the output port. Also they are generally not capable of extremely rapid or programmed selection of conduits.

SUMMARY OF THE INVENTION

The purpose of the present invention is to provide a control valve which can randomly select conduits to control the flow of fluids in several conduits to a single output.

The present invention is comprised of a housing formed by a base plate and a cover plate with a cavity being formed therebetween. The cavity is in communication with a single port in the base plate. A slider confined in the cavity by the bearing plate has a plurality of ports which can be selectively aligned with the single port in the base plate. Actuators in the sides of the cavity move the slider from one corner of the cavity to another to align the port in the base plate with one of the ports in the slider. The slider has the same geometrical shape as the cavity and is moved rapidly from corner to corner to selectively align a port in the slider with the port in the base plate. Selective operation of the actuators in the side walls of the cavity allows selection of the port to be in alignment with the output port in the base plate.

A number of configurations are possible with the fluid conduits being either connected directly to the plurality of ports in the slider or, by use of a manifold, being connected to ports in the cover plate which are selectively aligned with the ports in the slider. In one configuration the slider has one port which is selectively aligned with ports in the cover or bearing plate and a manifold communicating with the output port in the base plate. The valve can be used to control the flow of fluid in a number of conduits or monitor the fluid flowing in these conduits.

In one configuration the valve can control a plurality of tandem groups of fluid conduits by use of a multiple slider. The valve can selectively monitor or control the flow of fluid in a plurality of conduits with automatic alignment registration of input and output ports. This is because the slider is selectively moved from corner to corner allowing the plurality of conduits to be aligned with the single output port in the base plate. Thus, by simply moving the slider from one corner to another by actuators in the sides of the cavity, the particular conduit is automatically aligned with the output port through ports in the slider. That is, when the slider is in any one of the corners of the cavity, one of the ports communicating with an input conduit is aligned with or in registration with the output port. Thus, rapid automatic alignment of input and output is automatically assured.

It is one object of the present invention to control the flow from a plurality of conduits to a single output port with automatic registration and alignment.

Another object of the present invention is to provide a control valve which can randomly select an input conduit for alignment with an output port.

Yet another object of the present invention is to provide a control valve which can be programmed to rapidly and automatically monitor or control the flow of plurality of input conduits in a predetermined sequence.

These and other objects of the invention will become apparent from the following detailed description of the invention when considered in conjunction with the accompanying drawings.

DETAILED DESCRIPTION OF THE PREFERRED EMBODIMENT

Figure 1:
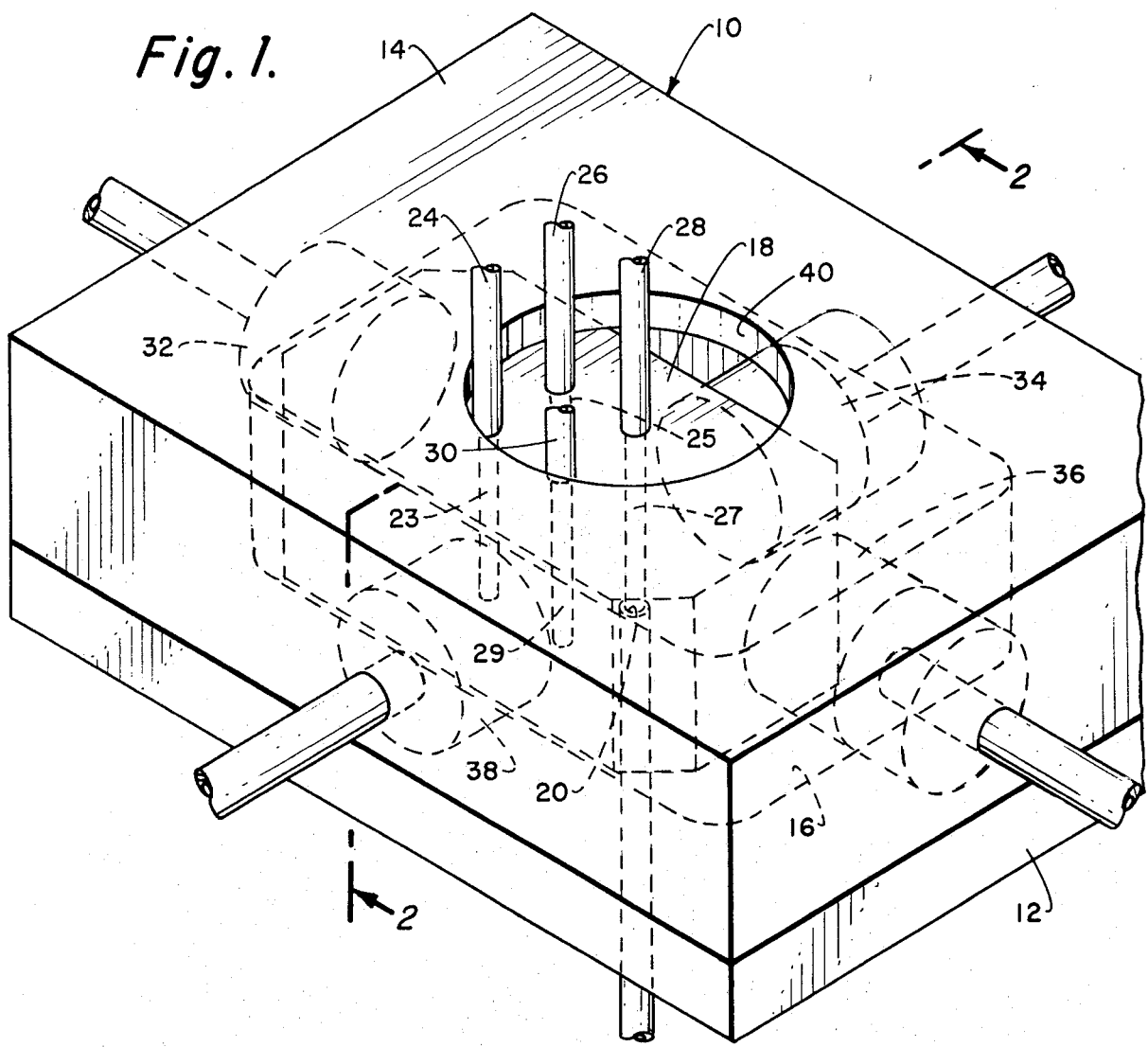
FIG. 1 is a semi-schematic mechanical drawing of the control valve of the invention.
Figure 2:
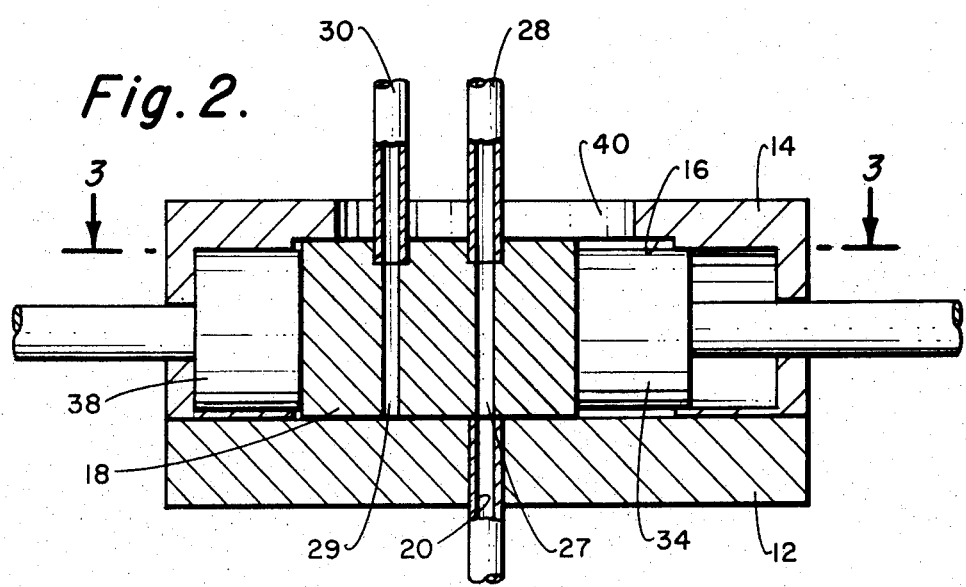
FIG. 2 is a sectional view of the control valve of FIG. 1 taken at 2—2.

Referring now to FIG. 1, the control valve is comprised of a housing 10 formed by a first or base plate or member 12 and a cover or bearing plate 14. The cover plate 14 has a retangular cavity 16 in which a slider valve member 18 of the same shape is confined. The slider 18 has a planar surface 19 contiguous with and slideable against the planar surface 17 of the rectangular cavity 16. A port 20 in the base plate 12 is in communication with the cavity 16. As shown in FIG. 2, the valve member 18 has a flat or planar surface which is contiguous to and slides on the flat or planar surface of the plate member 12.

The cavity 16, as was indicated previously, is in the shape of a rectangle with substantially perpendicular sides forming a rectangular parallelepiped, as is the slider 18. The cavity 16 is shown in the cover or bearing plate 14, but could just as well be in either or partially in both, if desired. Thus, the slider 18 has the same geometrical shape (i.e. shape of planar surfaces 17 and 19 are identical) as the cavity and has a plurality of ports 23, 25, 27 and 29 which selectively align with the port 20 in the base plate when the slider is in any of the corners of the cavity 16. The slider is slightly smaller in length and width than the cavity and is free to move from corner to corner selectively aligning the ports in the slider with the port 20 in the base plate. Conduits 24, 26, 28 and 30 are attached to ports 23, 25, 27 and 29 in the slider 18 through an aperture 40 in the cover plate 14.

Valve member 18 is translated, i.e. moved without rotation, by translating means in the form of actuating piston means 32, 34, 36 and 38. The actuators 32, 34, 36 and 38 move the slider 18 in translation from side to side in the cavity 16, along two orthogonal axes in a plane substantially parallel with the planar surfaces 17 and 19. The actuators 32 through 38 may be operated by solenoids, pneumatically or any other suitable means. The actuators are illustrated as pistons in the sides of the cavity 16 in the bearing plate 14 and are selectively extended moving the slider into register between the output port 20 and any of the input ports 23, 25, 27 and 29.

The operation of the control valve is illustrated in FIGS. 3a through 3d. In this figure which is a cross-section through the bearing plate 14 at 3—3 or with the base plate 12 removed, the slider 18 is selectively moved from corner to corner by the actuators which are shown as pistons 32 through 38, causing the ports 23, 25, 27 and 29 to selectively be in register with the output port 20. Simultaneous operation of any two of the actuating pistons 32 through 38 causes the slider 18 to move from corner to corner. Access to the ports 23, 25, 27 and 29 in the slider 18 is permitted by an aperture 40 (FIG. 1) in the bearing plate 14. The port 20 is generally at the center of the cavity 16 so that when the slider 18 is in any of the four corners, one of the ports 23, 25, 27 or 29 in the slider 18 is in alignment with the output port 20 (shown as black dot).

The amount of movement of the slider 18 is determined by the size of the slider in relation to the cavity 16 and the size of the hole pattern of ports 23, 25, 27 and 29 in the slider 18. As shown in FIG. 2, the actuating plungers, e.g. 38, also constitute stop surfaces against which the member 18 is pressed by the opposite plunger, e.g. 38, to effect registration between port 20 and one of the valve member ports, e.g. 27. These two dimensions may be selected to permit minimum movement for registration of one of the four ports with the output port. This improves the rapid selection of any one of the ports by minimizing the amount of movement of the slider 18.

Figure 3A:
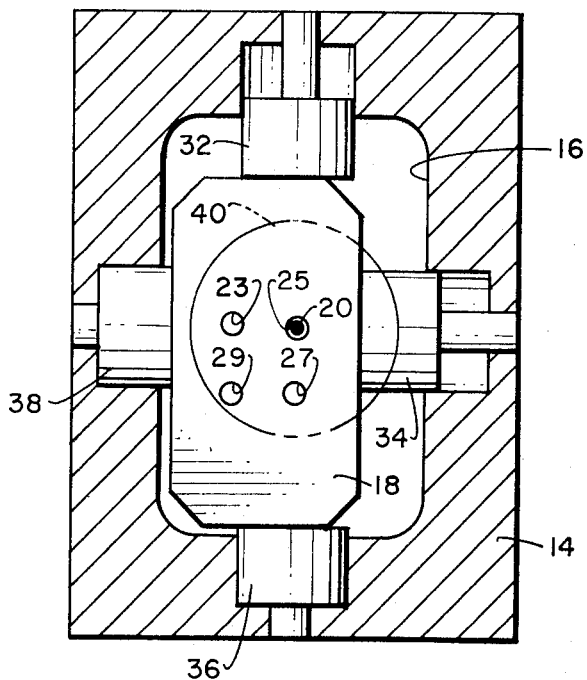
FIGS. 3a through 3d illustrate the selective operation of the control valve of the invention.
Figure 3B:
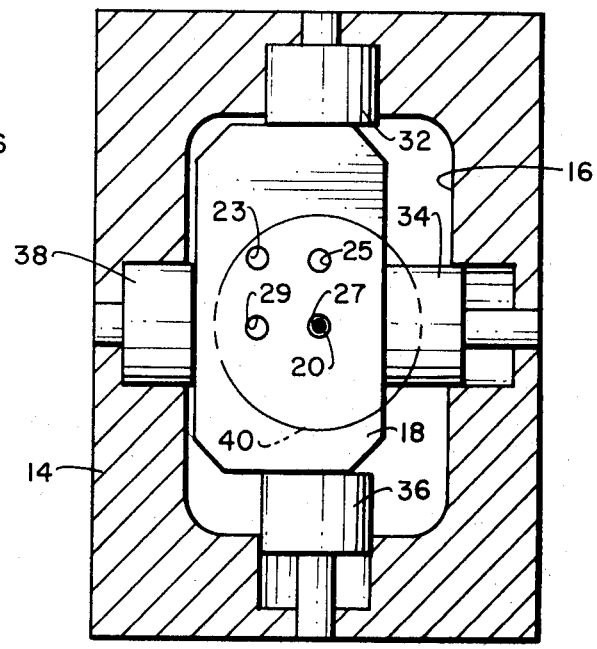
Figure 3C:
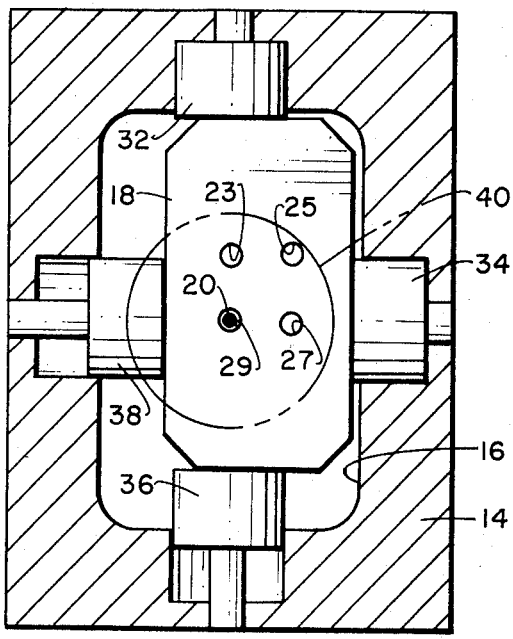
Figure 3D:
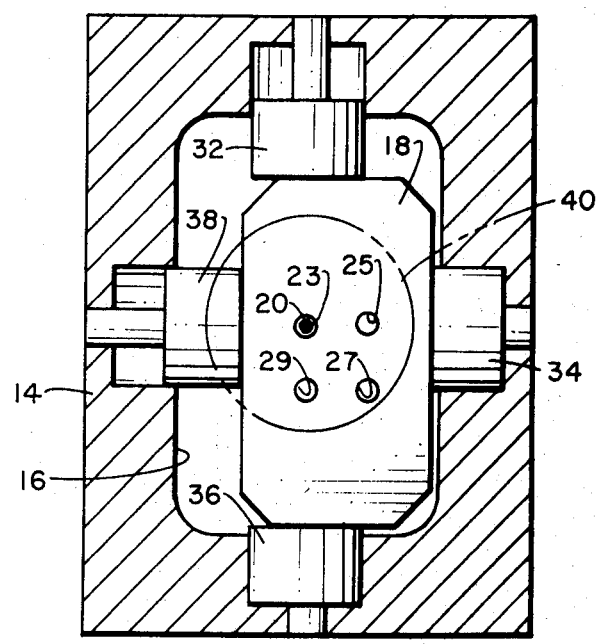

In FIG. 3a, port 25 is in register with output port 20 when actuators 32 and 34 are simultaneously operated. The next step is to operate actuators 34 and 36 simultaneously moving the slider to cause port 27 to be in alignment with output port 20, as shown in FIG. 3b. In FIG. 3c, actuators 36 and 38 are operated moving the slider 18 into the position shown, aligning port 29 with output port 20. FIG. 3d shows a completion of the cycle with port 23 in alignment with the output port 20. While the invention is discussed in terms of a plurality of inputs and one output, it should be obvious that the reverse is equally acceptable. That is, one input to a plurality of outputs.

It should be appreciated that by simultaneously operating any of the actuators 32 through 38, selective alignment of any of the ports 23, 25, 27 and 29 with the output port 20 can be provided. That is, the valve can be operated to randomly select any one of the input ports 23, 25, 27 and 29 and does not have to be operated in the sequence shown in FIGS. 3a through 3d. That is, the first operation could be that shown in FIG. 3b with the next operation being that shown in 3d. The alignment of the ports is determined by which of two of the four actuators are simultaneously operated. Thus, the actuators can be programmed to sequence and align the input ports with the output port 20 in any sequence desired, or they can be selected randomly. Thus, operation of any two adjacent actuators 36, 38 selects port 29, while actuation of actuators 32 and 34 selects port 25. Actuation of 34 and 36 selects port 27, and actuation of 32 and 38 selects port 23. The sequence of operation of any two adjacent pistons 32, 34, 36 or 38 can be randomly selected.

Figure 4:
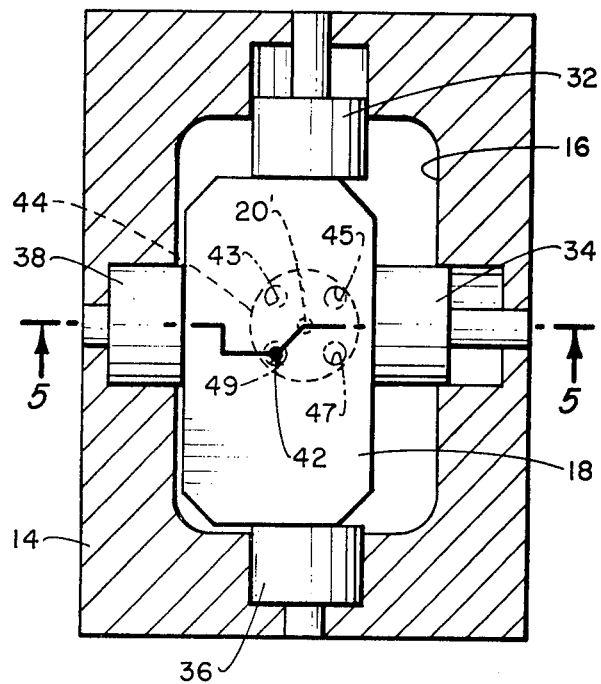
FIG. 4 is a sectional diagram of a variation of the invention of FIG. 1.
Figure 5:
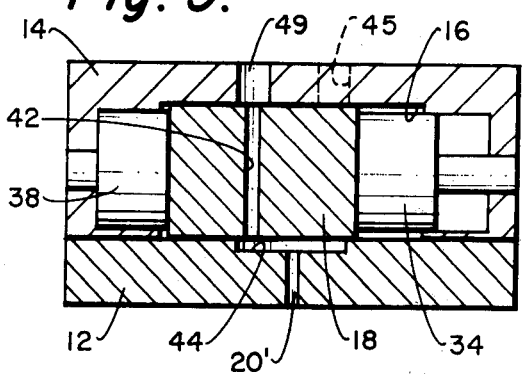
FIG. 5 is a sectional view of the invention variation of FIG. 4 taken at 5—5.
Figure 6:
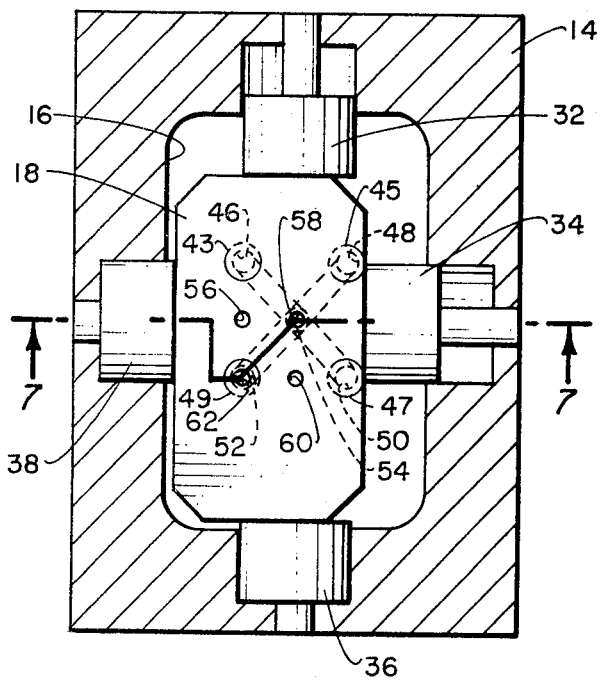
FIG. 6 is another sectional diagrammatical variation of the invention of FIG. 1.
Figure 7:
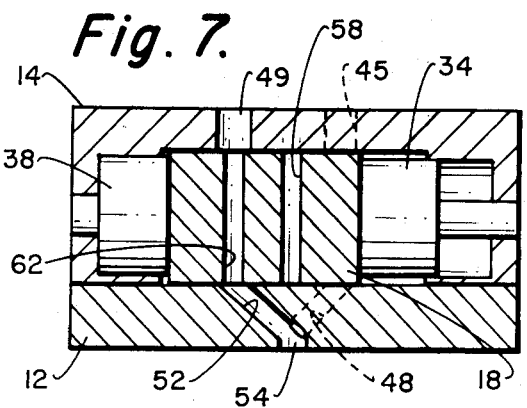
FIG. 7 is a sectional view taken at 7—7 of FIG. 6.

The embodiment shown in FIG. 1 has the conduits 24, 26, 28 and 30 connected directly to the ports 23, 25, 27 and 29 in the slider 18, which means that the conduits move with the slider. This may be undesirable if the conduits 24, 26, 28 and 30 are not very flexible. For that reason the embodiments of FIGS. 4 and 6 are shown in which the conduits 24, 26, 28 and 30 may be connected to ports in the bearing plate 14. FIGS. 4 and 6 are the same section taken at 3—3 of FIG 2, except for the change in port arrangement. In the embodiment of FIG. 4, four ports, represented schematically by dotted circles 43, 45, 47 and 49, are provided in the bearing plate 14 which are selectively in communication with a single port 42 of the slider. Thus, the slider 18 is selectively in registration with any one of the four ports 43, 45, 47 and 49 now provided in the bearing plate. In order to align these input ports with the output port 20', the manifold 44 is provided in the base plate. That is, in order to assure connection of the four ports 43, 45, 47 and 49 in the cover or bearing plate to the port 20', the diameter of the manifold 44 must be the same as, or slightly larger than, the maximum dimension of the four-hole pattern of ports 43, 45, 47 and 49. Thus, the input ports when they are aligned with the port 42 in the slider will always be in communication with the manifold 44, shown in FIG. 5 and shown dotted in FIG. 4. Instead of the manifold 44, Y-shaped interconnecting ports 46, 48, 50 and 52 can be provided in communication with the single port 54 as shown in FIG. 7, if desired.

A variation of the embodiment in FIG. 4 is shown in FIG. 6. In this embodiment the ports 43, 45, 47 and 49 in the bearing plate, as shown in FIG. 5, will still be provided; but the slider 18 will have a plurality of ports 56, 58, 60 and 62 in the manner similar to the embodiment of FIG. 1. Thus, the slider 18 will not need to move nearly as much as the embodiment of FIG. 4 in order to align an input port with the output port 20' (54). Each port 56, 58, 60 or 62 in the slider 18 is again selectively aligned with a port 43, 45, 47 or 49 in the bearing plate 14 and the output port 20' through a manifold 44, as shown in FIG. 5, or the Y-shaped interconnecting ports 46, 48, 50 and 52 connecting to output port 54, shown in FIG. 7.

Figure 8:
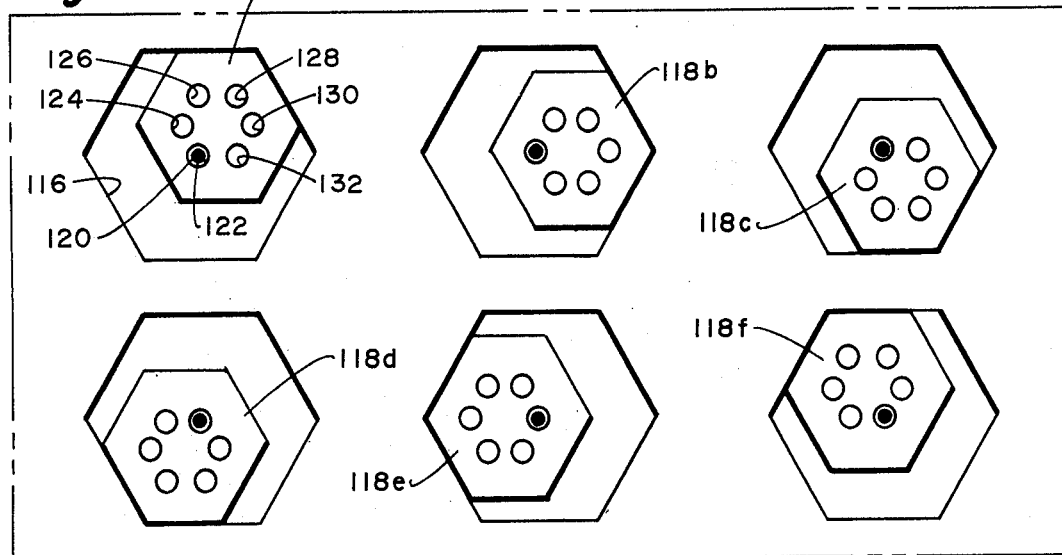
FIG. 8 is a logic diagram illustrating another variation of the invention of FIG. 1.

The invention is suitable for use with other configurations than rectangular or square, if desired, and is only limited by practical mechanical considerations, such as the number of sides increasing proportionately the amount of space required by the fact that actuators must be included in each side in order to move the slider 18 from corner to corner. FIG. 8 is a logic diagram illustrating the operating sequence for a six-sided (hexagon) cavity and slider. The slider 118a is in a first position in the cavity 116 with a first port 122 in the slider in registration with the output port (represented by black dot 120) which again is in the center of the cavity 116. The control valve may next be moved to any one of five additional selected positions indicated as slider positions 118b through 118f, with ports 124, 126, 128, 130 and 132 being selectively aligned with port 120 in any pre-programmed sequence.

Figure 9:
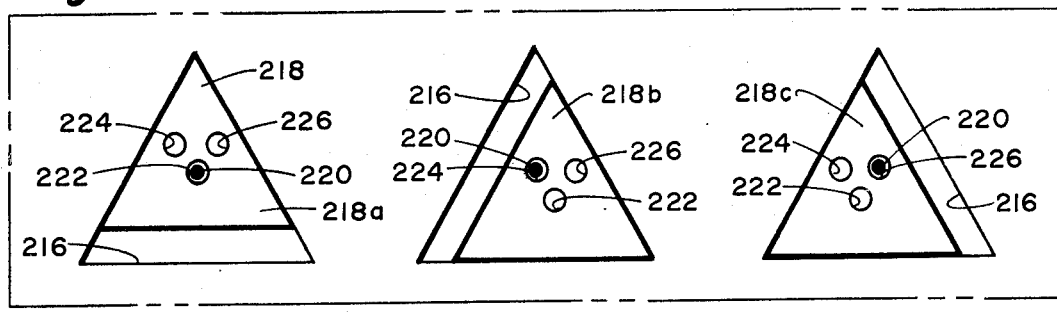
FIG. 9 is a logic diagram showing a further variation of the invention.

The logic diagram of FIG. 9 illustrates the operation of the device for a triangular-shaped slider 218 and cavity 216. The number of ports or input ports 222, 224, and 226 which can be aligned with a single output port is controlled by the number of sides in the shape or configuration of the cavity 216 and the slider 218. Here the operation of the device is considerably simplified because only one actuator must be operated at a time, because there are only three sides and three corners. The slider 218 of FIG. 9 is successively moved from one position represented by 218a to selected positions 218b and 218c, successively aligning the three ports 222, 224 and 226 in the slider with the single centrally located port 220 in a housing. Again, it should be emphasized that the sequence can be in any preselected manner and may move from the first to the second to the third or from the first to the second, back to the first and then to the third, if desired. The alignment of the input and output ports depends only upon which actuator is selected for operation in the configuration of FIG. 9 or the actuators simultaneously operated in the rectangular, square or hex configurations previously discussed.

Figure 10:
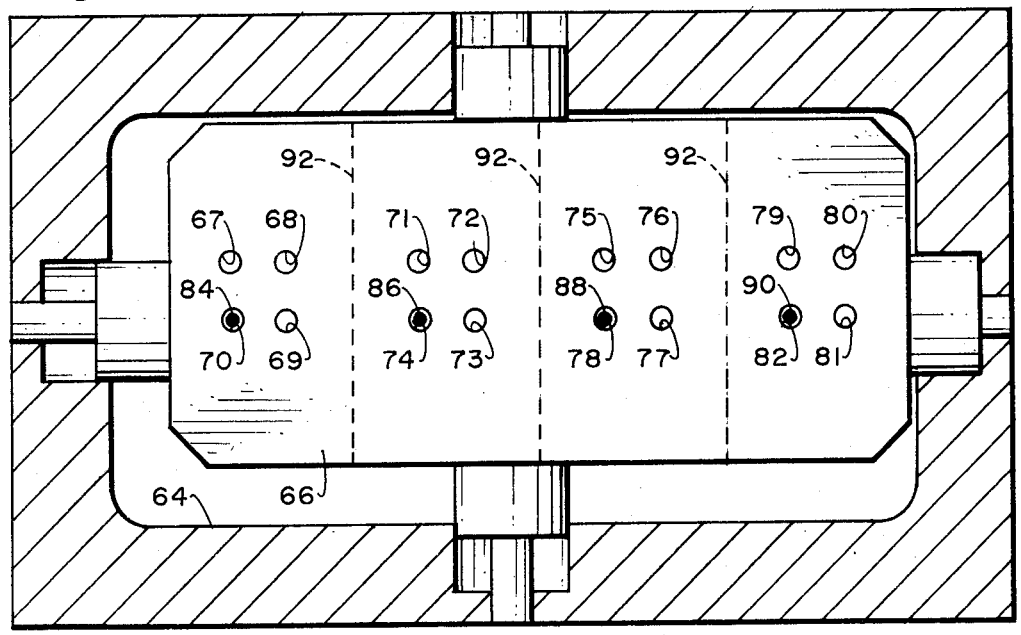
FIG. 10 is a variation of the invention of FIG. 1 showing a multiple unit control valve and slider.

FIG. 10 illustrates a tandem or multiplex unit system in which the housing has a large cavity 64 for a multiple or tandem slider valve member 66, forming one large slider having sixteen ports, 67 through 82, divided into four groups, each consisting of four ports, e.g. 67–70. Each section of the slider has a four-hole pattern depending upon the particular input or output port configuration desired. Again, as two adjacent actuators are simultaneously operated, the ports 70, 74, 78 and 82 in the lower left-hand corner of the ports 84, 86, 88 and 90, respectively, in each section of the control valve. Thus, any one of sixteen input ports can be selectively aligned with the respective output port associated with the group. The dotted lines 92 merely illustrate the similarity of the multiple group slider 66 and the original slider 18 of FIG. 1.

As was indicated in the description of the drawings, the figures illustrate the invention in semi-schematic form with unnecessary details omitted for clarity. Features such as sealing can be provided in any suitable manner known to those skilled in the art. One such method of sealing is shown in FIG. 7 of U.S. Pat. No. 3,246,667, issued to the same inventor as the present invention, on Dec. 21, 1964, and is incorporated herein by reference. The cavity 16 is another feature which can be constructed in numerous alternative fashions as will be obvious to those skilled in the art. For example, cavity 16 as an alternative could be partially in the base 12 or all in the base.

The operation and amount of ports which can be controlled are only limited by the practical considerations of increased complexity due to the number of sides provided by many-sided cavities and sliders. Also, the size of the ports and the hole pattern of the ports determines the size or limitations on the control functions of the valve. For example, for random connection of four input ports to a single output port, the control valve can be made very small with the movement of the slider being determined by the pattern of the input ports. If the hole pattern of the ports is made very close together, then the incremental movement of the slider can be small, with consequent rapid and precise control. This permits the system to be used for controlling or monitoring a large number of conduit lines which have a low-duty cycle (ratio of on time to off time small).

Further, by use of multiple units, as shown in FIG. 10, with the unit of FIG. 1 (i.e. cascading of control valves), sixteen separate lines can be reduced to one line with the control sequence being programmed to selectively monitor any one of the sixteen lines or all sixteen lines in any predetermined sequence. Cascading is provided by connecting the multiple unit of FIG. 10 to sixteen inputs and the four output ports to the four input ports of the control valve as shown in FIG. 1, which thus reduces the sixteen input ports of FIG. 10 to the single output port of FIG. 1. It is now only a matter of properly programming the two valves to selectively monitor or control the sixteen input ports to one output.

Obviously, many modifications and variations of the invention are possible in light of the above teachings. Thus, it is therefore to be understood that the full scope of the invention is not to be limited to the details disclosed herein and may be practiced otherwise than as specifically described.

What is claimed is:
1. A valve comprising:
housing means having a cavity therein,
a slideable valve member having a flat surface,
means for mounting said valve member in said cavity for translation without rotation along a plurality of intersecting axes, fixed with respect to said valve member and lying in the plane of said surface, and comprising a first plate member having a flat surface contiguous to and across which said valve member surface slides,
first conduit means communicating with the exterior of said housing means and including first port means in one of said surfaces,
second conduit means communicating with the exterior of said housing means and including second port means in the other of said surfaces selectively registrable with certain of said first port means upon predetermined translation without rotation of said valve member along said axes,
first translating means for translating without rotation said valve member in said cavity along one of said axes for effecting registration between certain of said first port means and certain of said second port means;
second translating means for translating without rotation said valve member in said cavity along another of said axes for effecting registration between certain of said first port means and certain of said second port means.

2. Valve in accordance with claim 1 wherein:
said first port means is in the surface of said valve member,
said second port means is in the surface of said first plate member.

3. Valve in accordance with claim 1 wherein:
said first port means is in the surface of said first plate member,
said second port means is in the surface of said valve member.

4. Valve according to claim 3 wherein:
a plurality of fluid conduits are directly connected to said port means in said valve member, and
said conduits pass through an aperture in said housing in communication with said cavity.

5. Valve according to claim 1, wherein said housing is comprised of:

said first plate member, a second plate member secured to said first plate member with said cavity being formed therebetween and wherein said plate members confine said slideable valve member in said cavity.

6. A multiplex valve comprising:

housing means having a cavity therein, a slideable valve member having a flat surface, means for mounting said valve member in said cavity for translation along a plurality of intersecting axes, and comprising a first plate member having a flat surface contiguous to and across which said valve member surface slides, a plurality of first ports in one of said surfaces, second ports in the other of said surfaces and comprising a plurality of groups of ports, each group comprising ports arranged in a predetermined pattern common to all of said groups, the ports of a given group being selectively registrable with an associated one of said first ports upon predetermined translation of said valve member along said axes, translating means for selectively translating said valve member in said cavity for effecting registration between each of said first ports and a selected one in each of said group of ports.

7. A random access control valve comprised of:

a housing having an aperture, a rectangular cavity in said housing having a planar surface with a port therein, a slideable valve block confined in said cavity and having a planar surface contiguous with and slideable against the planar surface of said cavity, with four ports located at the corners of a rectangle, said valve block being movable in said cavity along axes parallel to said planar surfaces, sliding of said block toward each corner of said cavity bringing a respective one of said four ports into registry with said cavity surface port, actuating means for sliding said block toward said cavity corners, conduits passing through said aperture and connected to respective four ports.

8. A valve comprising:

housing means having a cavity therein, a slideable valve member having a flat surface, means for mounting said valve member in said cavity for translation along two orthogonal intersecting axes, fixed with respect to said valve member and lying in the plane of said surface, and comprising a first plate member having a flat surface contiguous to and across which said valve member surface slides, first conduit means communicating with the exterior of said housing means and including a first port in said surface of said valve member, second conduit means communicating with the exterior of said housing means and including four ports in said surface of said first plate member, located at the corners of a rectangle and selectively registrable with said first port upon predetermined translation of said valve member along said axes, translating means for selectively translating said valve member in said cavity back and forth on said two orthogonal axes, or a vector combination of said axes, for effecting registration between said first port and a selected one of said four ports.

9. Valve in accordance with claim 8, including a manifold in said housing in communication with said first port at all positions of said valve member, and constituting a portion of said first conduit means.

10. A valve comprising:

housing means having a cavity therein, a slideable valve member having a flat surface, means for mounting said valve member in said cavity for translation along a plurality of intersecting axes, fixed with respect to said valve member and lying in the plane of said surface, and comprising a first plate member having a flat surface contiguous to and across which said valve member surface slides, first conduit means communicating with the exterior of said housing means and including a first port in one of said surfaces, second conduit means communicating with the exterior of said housing means and including a plurality of ports in the other of said surfaces selectively registrable with said first port upon predetermined translation of said valve member along said axes, a plurality of actuating means proportional to the number of said axes for selectively translating said valve member in said cavity along said axes for effecting registration between said first port and a selected one of said plurality of ports.

11. Valve according to claim 10 wherein said cavity has a plurality of straight sides, substantially perpendicular to said flat surfaces, and proportional to the number of said actuating means.

12. Valve according to claim 10 wherein each actuating means comprises a piston.

13. A valve comprising:

housing means having a cavity therein, a slideable valve member having a flat surface, means for mounting said valve member in said cavity for translation along a plurality of intersecting axes, fixed with respect to said valve member and lying in the plane of said surface, and comprising a first plate member having a flat surface contiguous to and across which said valve member surface slides, said valve member having a periphery formed by a plurality of straight sides substantially perpendicular to said first plate member surface, said cavity having therearound a plurality of stop surfaces corresponding to said sides and spaced around the periphery of said first plate member, first conduit means communicating with the exterior of said housing means and including a first port in one of said surfaces, second conduit means communicating with the exterior of said housing means and including a plurality of ports in the other of said surfaces selectively registrable with said first port upon predetermined translation of said valve member along said axes, translating means for selectively slidingly translating said valve member in said cavity along said axes against a selected pair of adjacent stop surfaces, for effecting registration between said first port and a selected one of said plurality of ports.

14. Valve according to claim 13 wherein said translating means are comprised of:

plunger means mounted in the side faces of said cavity.

15. Valve according to claim 13 wherein:

the number of said plurality of ports equals the number of said sides.

16. Valve according to claim 15 wherein:

each said side has translating means for selectively moving said valve member to an opposite stop surface.

17. Valve according to claim 16 wherein:

said cavity is a rectangular parallelepiped, and said valve member is a rectangular shape smaller than the rectangular shape of said cavity, whereby said valve member may be moved from corner to corner of said rectangular cavity by said translating means.

18. Valve according to claim 16 wherein said cavity and said valve member are substantially the same geometric shape with the valve member being smaller than said cavity.

* * * * *